F. DAVIS.
RULING MACHINE.
APPLICATION FILED AUG. 12, 1919.
1,333,471. Patented Mar. 9, 1920.
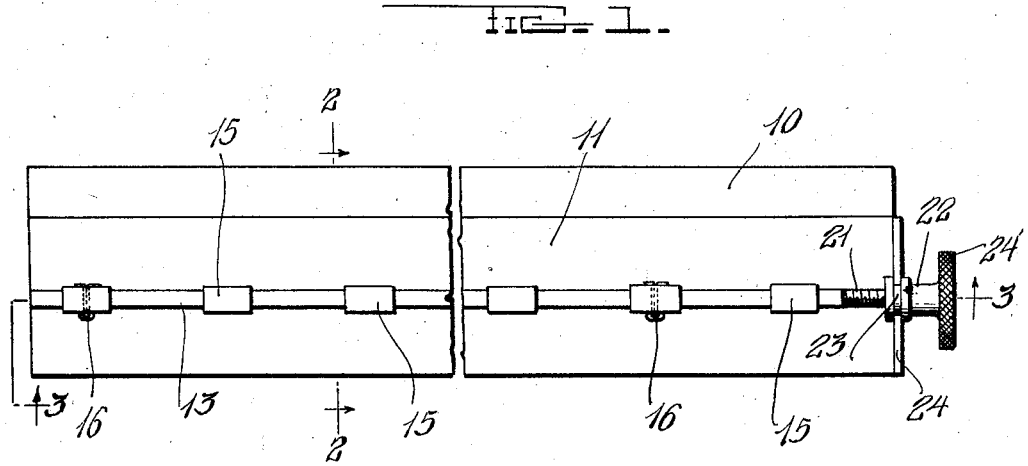
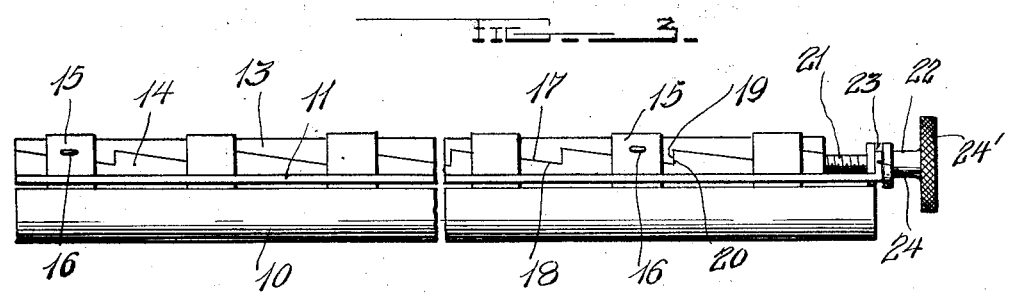
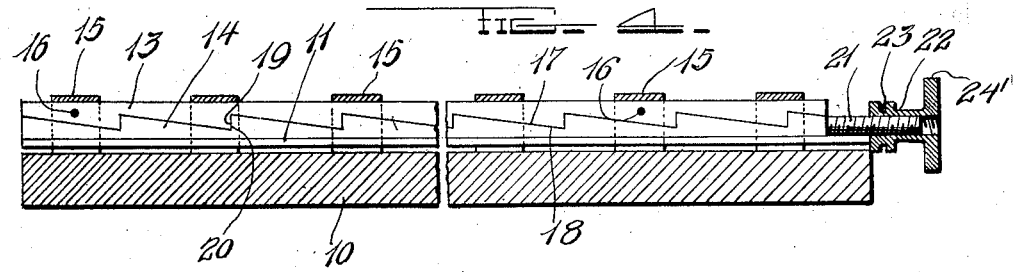
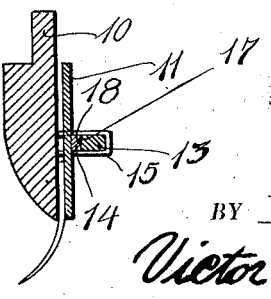
WITNESS:
INVENTOR.
BY *Frank Davis*
*Victor J. Evans*
ATTORNEY.

UNITED STATES PATENT OFFICE.

FRANK DAVIS, OF ATLANTA, GEORGIA.

RULING-MACHINE.

1,333,471.  Specification of Letters Patent.  Patented Mar. 9, 1920.

Application filed August 12, 1919. Serial No. 316,995.

*To all whom it may concern:*

Be it known that I, FRANK DAVIS, a citizen of the United States, residing at Atlanta, in the county of Fulton and State of Georgia, have invented new and useful Improvements in Ruling-Machines, of which the following is a specification.

This invention relates to ruling machines, and comprehends certain improvements in the pen clamp disclosed in Patent #1,067,001 issued to me July 8, 1913.

The present invention embodies a novel construction of means for effecting a quick adjustment of the sections of the clamps and gripping the pens therebetween with a more uniform pressure throughout the length of the clamp.

The nature and advantages of the invention will be better understood when the following detail description is taken in connection with the accompanying drawings, the invention residing in the construction, combination and arrangement of parts as claimed.

In the drawings forming part of this application like numerals of reference indicate similar parts in the several views and wherein:—

Figure 1 is a view in elevation of the clamp constructed in accordance with the present invention.

Fig. 2 is a transverse sectional view taken on the line 2—2 of Fig. 1.

Fig. 3 is an edge elevation.

Fig. 4 is a vertical sectional view taken on the line 4—4 of Fig. 1.

The clamp forming the subject matter of the present invention embodies the sections 10 and 11 between which the pens 12 are adapted to be clamped at spaced intervals along the longitudinal edge of the clamp. The section 11 is moved into gripping relation with the section 10 by means of the bars 13 and 14 respectively, in a manner to be presently described. The bars 13 and 14 are arranged parallel and are straddled by U-shaped guiding elements 15. The guides 15 are passed through openings in the section 11 and are terminally secured to the section 10.

The bar 13 remains stationary with respect to the section 11, while the bar 14 is arranged to slide over the section 11 and between the latter and said bar 13. The bar 13 may be held fixed relatively to the section 11 in any suitable manner but as shown in this specific instance, cotter pins 16 are passed through the bar 13 and certain of the guides 15 holding the bar 13 in spaced relation to the section 11. The confronting edges of the bars 13 and 14 are provided with oppositely beveled contacting portions 17 and 18 respectively, and shoulders 19 and 20 which coact to limit the movement of the bar 14 with relation to the bar 13. Manifestly by reason of the construction disclosed the section 11 is moved into clamping relation with the section 10 of the clamp when the bar 14 is moved in one direction, or in the direction to bring the highest portion of the inclined surfaces 17 and 18 respectively closer together. When the bar 14 is adjusted in this direction a wedge action takes place between the bar 13 and the section 11 moving the latter toward the section 10 with a uniform pressure throughout its entire length. When the bar 14 is moved in the reverse direction the shoulders 19 and 20 are brought into contact with each other to limit the adjustment of the bar 14, in which position of the bar, the section 11 is permitted to move away from the section 10 thus releasing the pens to permit the latter to be readily removed from the clamp.

Any suitable means may be employed for adjusting the bar 14 in the manner thus described, but as shown in this specific instance, the bar 14 is provided with a threaded extension 21 at one end. A sleeve 22 having a groove 23 is mounted for rotation, one end of the section 11 being formed with a flange 24 partly fitted within the groove 22 as shown. The sleeve 21 is provided with a knurled disk 24' at one end by means of which the sleeve is rotated, the sleeve being interiorly threaded to accommodate the threaded extension of the bar 14. Consequently, by rotating the sleeve in one direction, the bar 14 is moved over the section 11 in a manner to effect a clamping relation therebetween and the section 10 while reversing the rotation of the sleeve separates the parts to permit the pens to be readily removed from between the sections.

While I have shown and described what I consider the preferred embodiment of the invention, I desire to have it understood that I do not limit myself to the exact construction and arrangement of parts herein shown, and that such changes may be resorted to when desired as fall within the scope of what is claimed.

Having thus described my invention what I claim as new is:

1. A pen clamp comprising clamping sections, a fixed member arranged longitudinally of said sections, a movable member interposed between the fixed member and the adjacent section, means for adjusting the movable member longitudinally of the clamp and said members coöperating to effect a clamping relation between the sections upon adjustment of the movable member.

2. A pen clamp comprising clamping sections, one of said sections having openings, a fixed bar arranged longitudinally of the said sections, a movable bar interposed between the fixed bar and the section having the openings, guides straddling said bars and passed through said openings and terminally secured to the other section, means for adjusting the movable bar longitudinally of the clamp, said bars being designed to effect a clamping relation between the sections upon adjustment of the movable bar in one direction.

3. A pen clamp comprising clamping sections, a fixed bar arranged longitudinally of the sections, a movable bar interposed between the fixed bar and the adjacent section, guides for said movable bar, means for adjusting the movable bar longitudinally of the clamp, said bars having opposite beveled contacting portions coöperating to effect the clamping relation between the sections of the clamp upon adjustment of the movable bar in one direction.

4. A pen clamp comprising clamping sections, a fixed bar arranged longitudinally of said sections a movable bar interposed between the fixed bar and the adjacent sections, guides for said movable bar, a threaded extension on the movable bar, a sleeve mounted for rotation on one of the clamping sections and interiorly threaded to accommodate the threaded extension of the movable bar, means for rotating the sleeve whereby said movable bar is slid longitudinally over the clamp, and said fixed and movable bars being designed to effect a clamping relation between said sections when the movable bar is adjusted in one direction.

In testimony whereof I affix my signature.

FRANK DAVIS.